United States Patent Office 3,484,444
Patented Dec. 16, 1969

3,484,444
INTERNAL SALT OF SCOPOLAMINE
Corominas Juan Pares, Barcelona, Spain, assignor of one-half to Jean R. Ricard, Barcelona, Spain, and one-half to Laboratories Om Societe Anonyme, a Swiss company
No Drawing. Filed Oct. 12, 1965, Ser. No. 495,311
Claims priority, application Spain, Oct. 13, 1964, 305,135; June 16, 1965, 314,578
Int. Cl. C07d 43/06, 143/14
U.S. Cl. 260—292                                                  1 Claim

ABSTRACT OF THE DISCLOSURE

A water-soluble internal salt of a tertiary amine, of the formula $$X-CH_2-CH_2CH_2OSO_2$$

wherein X is a pharmacologically active amine selected from the group consisting of codeine, scopolamine, hexamethylene tertramine, propoxyphene, dextromethorphan, methadone, aminopyrine and chlorpromazine.

---

This invention relates to novel water-soluble therapeutic products derived from tertiary amines having a known pharmacological action.

According to the present invention I provide water-soluble salts of tertiary amines by reaction in a suitable medium with 1,3-propane sultone. Such salts have a betainic structure.

Of therapeutic tertiary amines tested, very good results are obtained with hexamethylene tetramine, codeine, dextromethorphan, scopolamine, propoxyphene, methadone, aminopyrine and chlorpromazine. The reason for the importance of some of these internal salts is that a pharmacological study of them has shown as unexpected increase in the therapeutic properties of the salts over those of the starting amines and a clear reduction in toxicity, to an extent such that these products can be considered as new drugs.

The internal salt of scopolamine has been found to have an intense spasmolytic action, predominantly of a neurotropic kind, and has been found to have, but to not such a great extent, a miotropic and antihistaminic action. The relatively low toxicity which these compounds are thought to have is confirmed in this case. Its DL/50 when given intraperitoneally to rats is 3500 mg./kg., a figure confirming the low toxicity, for the anti-spasmodic compounds used at present are some 10 times more toxic. All the tertiary amines mentioned, when reacted with 1,3-propanesultone, give internal salts which are completely crystalline and are water-soluble and have a definite melting point.

The reaction is best performed in an aprotic medium, which is a satisfactory solvent of the 1,3-propanesultone as well as of the base used as starting material. After trying some high-dielectrical-constant solvents including dimethylformamide, dimethylsulphoxide and acetonitrile, the solvent finally selected was the latter. Optimum yields are usually obtained after 10 to 20 hours at the boiling point of the solvent.

For a better understanding of the foregoing, a description will now be given of some practical examples.

EXAMPLE I 1.0 g. of codeine base monohydrate (3.15 mmol) is dissolved in benzene and the water of crystallisation is removed azeotropically. The solvent is removed completely in vacuo, and 10 cc. of acetonitrile and 0.45 g. of 1,3-propanesultone (3.6 mmol) are added. The mixture is refluxed for 12 hours; a precipitate is obtained which, after filtration, washing in ether and drying in an oven at 110° C. for 4 hours, yields 0.800 g. of a water-soluble white substance having a melting point of from 267 to 270° C.

EXAMPLE II 1.12 g. of scopolamine base (3.7 mmol) are dissolved in 8 cc. of acetonitrile. 0.500 g. of 1,3-propanesultone (4.1 mmol) are added. The mixture is refluxed for 15 hours. The resulting precipitate is cooled, filtered, washed several times in absolute ether and oven-dried at 110° C. for 4 hours, to yield 1.1 g. of white slightly hygroscopic water-soluble product whose melting point is from 238 to 240° C.

EXAMPLE III 1.4 g. of hexamethylenetetramine (10 mmol) are suspended in 10 cc. of acetonitrile. 1.2 g. of 1,3-propanesultone (10 mmol) are added and the mixture is heated at 60° C. for 10 hours. A white precipitate forms rapidly. This precipitate is allowed to cool, filtered and washed several times in dry ether, then oven-dried at 110° C. for 2 hours. 2.2 g. of a white product whose melting point is from 210–215° C. are obtained.

EXAMPLE IV 0.78 g. of propoxyphene base (2.2 mmol) is dissolved in 5 cc. of acetonitrile and 0.35 g. of 1,3-propanesultone (3 mmol) is added. The mixture is refluxed for 6 hours; after the first hour of refluxing a white precipitate starts to appear and the quantity thereof increases as time goes on. After cooling, filtering and washing in ether, 0.62 g. of a white product whose melting point is from 255 to 258° C. is obtained.

EXAMPLE V 0.70 g. of dextromethorphan base (2.4 mmol) is dissolved in 5 cc. of acetonitrile. 0.35 g. of 1,3-propanesultone (3 mmol) is added and the mixture is refluxed for 1 hour, then left at ambient temperature for 1 day. The mixture is then filtered and the precipitate washed and ground in ether, then filtered again, then oven-dried at 110° C. for 3 hours. 0.900 g. of a white product having a melting point of from 260 to 265° C. is obtained.

EXAMPLE VI 1.75 g. of methadone base (5.66 mmol) are dissolved in 40 cc. of freshly distilled acetonitrile. 0.73 g. of 1,3-propanesultone (6 mmol) is added and the mixture is refluxed for 17 hours. After the mixture has cooled down to ambient temperature, it is filtered and the precipitate washed in anhydrous ether and oven-dried at from 100 to 110° C. for 2 hours. 1.85 g. of a white crystalline product having a melting point of from 218 to 223° C. are obtained.

EXAMPLE VII 2.31 g. of aminopyrine (10 mmol) are dissolved in 30 cc. of acetonitrile. 1.30 g. of 1,3-propanesultone (10.6 mmol) are added. The mixture is refluxed for 20 hours. The mixture is then cooled to ambient temperature and the precipitate filtered, washed various times in anhydrous ether, and oven-dried at from 100 to 110° C. for 4 hours. 2.80 g. of a white product whose melting point is from 227 to 232° C. are obtained.

EXAMPLE VIII 1.6 g. of chlorpromazine base (5 mmol) obtained from its hydrochloride are dissolved in 35 cc. of acetonitrile. 0.75 g. of 1,3-propanesultone (6 mmol) are added. The mixture is refluxed for 10 hours, then allowed to cool to ambient temperature. It is filtered, and the precipitate washed several times in anhydrous ether, and oven-dried at from 100 to 110° C. 2.1 g. of a white product which has a melting point of from 268–270° C. are obtained; the product is not light-stable.

What I claim and desire to secure by Letters Patent is:

1. The water-soluble internal salt of tertiary amine, of the formula $$R_1R_2R_3\overset{\oplus}{N}-CH_2-CH_2CH_2OSO_2^{\ominus}$$

where $R_1R_2R_3N$ is scopolamine.

References Cited

UNITED STATES PATENTS

| | | | |
|---|---|---|---|
| 3,244,724 | 4/1966 | Guttmann | 260—309.6 |
| 3,151,123 | 9/1964 | Schenck et al. | 260—314 |

FOREIGN PATENTS 1,018,421  9/1961  Germany.

HENRY R. JILES, Primary Examiner

H. J. MOATZ, Assistant Examiner

U.S. Cl. X.R.

424—267; 260—243, 310, 570, 294.7, 490, 248.5, 285